United States Patent [19]

Ibuchi

[11] Patent Number: 4,674,734
[45] Date of Patent: Jun. 23, 1987

[54] AUTOMATIC DOCUMENT FEEDER

[75] Inventor: Yoshiaki Ibuchi, Nara, Japan

[73] Assignee: Sharp Kabushiki Kaisha, Osaka, Japan

[21] Appl. No.: 804,773

[22] Filed: Dec. 5, 1985

[30] Foreign Application Priority Data

Dec. 5, 1984 [JP] Japan .................. 59-258122

[51] Int. Cl.$^4$ ............................................. B65H 3/44
[52] U.S. Cl. ........................................ 271/9; 271/34; 271/35; 271/122; 271/117
[58] Field of Search ............... 271/121, 122, 9, 117, 271/3.1, 34, 35

[56] References Cited

U.S. PATENT DOCUMENTS

| 4,272,180 | 6/1981 | Satomi | 271/3.1 X |
| 4,346,879 | 8/1982 | Ruenzi | 271/121 |
| 4,436,298 | 3/1984 | Donner | 271/122 X |
| 4,500,084 | 2/1985 | McInerny | 271/122 X |

Primary Examiner—Richard A. Schacher
Attorney, Agent, or Firm—Birch, Stewart, Kolasch & Birch

[57] ABSTRACT

An automatic document feeder for feeding a documents individually to a document scanning surface of a copying machine from a pile of documents on a document tray. The automatic document feeder comprises: a first upper feeding member for feeding a document from the top of the document pile on the document tray; a second upper feeding member for further feeding the document supplied by the first upper feeding member; a first preventive member adjacent to the second upper feeding member to prevent more than one document from being fed through; a first lower feeding member for feeding a document from the bottom of the document pile on the document tray; an intermediate member that contacts the first lower feeding member and is linked with the first preventive member so as to prevent more than one document from being fed through; and a second lower feeding member, adjacent to the first preventive member, for feeding the document supplied by the first lower feeding member between the second lower feeding member and the first preventive member.

13 Claims, 4 Drawing Figures

AUTOMATIC DOCUMENT FEEDER

BACKGROUND OF THE INVENTION

The present invention relates to an electrophotographic copying machine having a document feeder, and more specifically to a document feeder with sorting capability regardless of the copying mode, be it single or duplex copying mode.

In an electrophotographic copying machine, a document placed on a document rest is optically scanned to form a corresponding electrostatic latent image on a uniformly charged photoreceptor as a recording medium. The latent image on the photoreceptor is visualized with toner at a developing section where the visualized image (toner image) is transferred by transfer means onto a copy paper which has been supplied in a timely manner. The copy paper onto which the image is transferred is separated from the photoreceptor and transported to a fixing device.

The fixing device is generally composed of thermal fixing rollers because of advantages in temperature control and compactness. The thermal fixing rollers serve to thermally fix the toner image on the copy paper. The fixing device may be composed of pressure fixing rollers which fix the toner image on the copy paper under pressure instead of heat. The copy paper on which the image is fixed is discharged out of the copying machine and sorted in accordance with the copying order on a copy tray.

Conventionally, a document to be copied is placed manually at a predetermined position on the document rest. Accordingly, each document must be replaced manually with a new one each time a copying operation is completed, which is quite troublesome. To avoid such a troublesome manual operation, an automatic document feeder is installed in the copying machine so that each document sheet is supplied and set at a predetermined position on the document rest by a transporting device provided on the document rest. With the copying machine equipped with the automatic document feeder, it is not necessary to manually replace an old document with a new one. Simultaneously, copying time is substantially saved. When copying documents with such a copying machine, a plurality of document sheets to be copied are piled on a document tray, normally with the image-bearing side downward, that is, faced towards the document tray. The document is supplied one by one either from the top or bottom of the document pile to the predetermined position on the document rest and optically scanned. After the image scanning, the document is transported away from the document rest while the next document is supplied to the predetermined position on the document rest.

Meanwhile, the copy papers on which image has been transferred are sorted in accordance with the copying order on the copy tray. For multiple copies of a plurality of documents, however, it is required to manually re-sort and arrange the copy papers in the copying order. To avoid this manual sorting operation, it is necessary to equip the copying machine with a plurality of copy trays, so that the copy papers are sorted and arranged on each of the copy trays in the same order as the original document sheets. Specifically, in making five copies of each document, five copies of the first document are delivered one by one to each of the five copy trays, and five copies of the second document are also delivered one by one to each of the five copy trays. This operation is repeated to the final document. In this case, it is necessary to discharge each copy paper in such a manner that the image-bearing side of the copy paper is faced to the copy tray.

As indicated in the above, an automatic document feeder and sorter, if added to a copying machine, can effect extremely simplified copying operation, substantially reduce the copying time and save time that would be required for sorting after copying operation. In addition to the single side copying function as described above, duplex copying function may be provided in the copying machine to provide for paper conservation. In applying duplex copying function after an image is formed on one side of a copy paper, another image is formed on the other side of the copy paper. In order to transfer a toner image formed on the photoreceptor onto the other side of the copy paper, the copying machine must be equipped with means to reverse the transport direction of the single sidecopied paper within the copying machine.

It is desired that the copying machine, in the duplex copying mode as well, be able to automatically feed and sort documents properly. In the conventional copying machine, however, document feeding and sorting mechanisms are devised only for single side copying operation. For instance, suppose three documents are to be copied one by one on each paper and that the three copy papers are to be sorted on one tray. When the documents are fed from the top (the third document), the copy papers on which images have been transferred are discharged on the copy tray with the image-transferred sides facing upward. In the duplex copying mode, the image on the third document is copied on one side of a paper, the image on the second document on the other side of the paper, and the image on the first document on one side of another paper with the other side left blank. Generally, however, it is preferable that the first and the second documents are copied on both sides of a paper and the third document on either side of another paper.

When the documents are fed to be copied from the bottom, the copy papers are discharged on the copy tray with the image-transferred sides facing downward. In this case, the first and the second documents are copied on both sides of one paper in the duplex copying mode. When discharged onto the copy tray, however, the second document image-transferred side is faced downward. Consequently, if three documents are copied in the duplex copying mode, the copy papers discharged are not sorted in accordance with the copying order. Thus, the sorter cannot fulfill its expected function in the duplex copying mode.

SUMMARY OF THE INVENTION

An object of the present invention is to provide an automatic document feeder that permits correct sorting of single side- or double side-copied papers in a copying machine with a duplex copying function.

Another object of the present invention is to provide an automatic document feeder that feeds a document from a plurality of documents by a pile in different methods.

A further object of the present invention is to provide an automatic document feeder that is capable of feeding documents one by one in any of the different methods.

Other objects and the further scope of applicability of the present invention will be apparent from the detailed description given hereinafter. It should be understood, however, that the detailed description and specific examples, while indicating preferred embodiments of the invention, are given by way of illustration only; various changes and modifications within the spirit and scope of the invention will be apparent to those skilled in the art from this detailed description.

To achieve the above objects, according to a preferred embodiment of the present invention, an automatic document feeder is provided that supplies documents one by one from a plurality of documents piled on a document tray to a document-scanning surface which comprises: a first upper feeding member that feeds the top sheet of the documents piled on the document tray; a second upper feeding member to further feed the document supplied by the first upper feeding member; a first preventive member installed adjacent to the second upper feeding member so as to prevent the second upper feeding member from feeding more than one sheet; a first lower feeding member that feeds the bottom sheet of the documents piled on the document tray; an intermediate member installed in contact with the first lower feeding member and linked with the first preventive member so as to prevent the first lower feeding member from feeding more than ..one sheet; and second lower feeding member adjacent to the first preventive member so that the document supplied by the first lower feeding member is fed in between the second lower feeding member and the first preventive member.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE INVENTION

Figure 1:
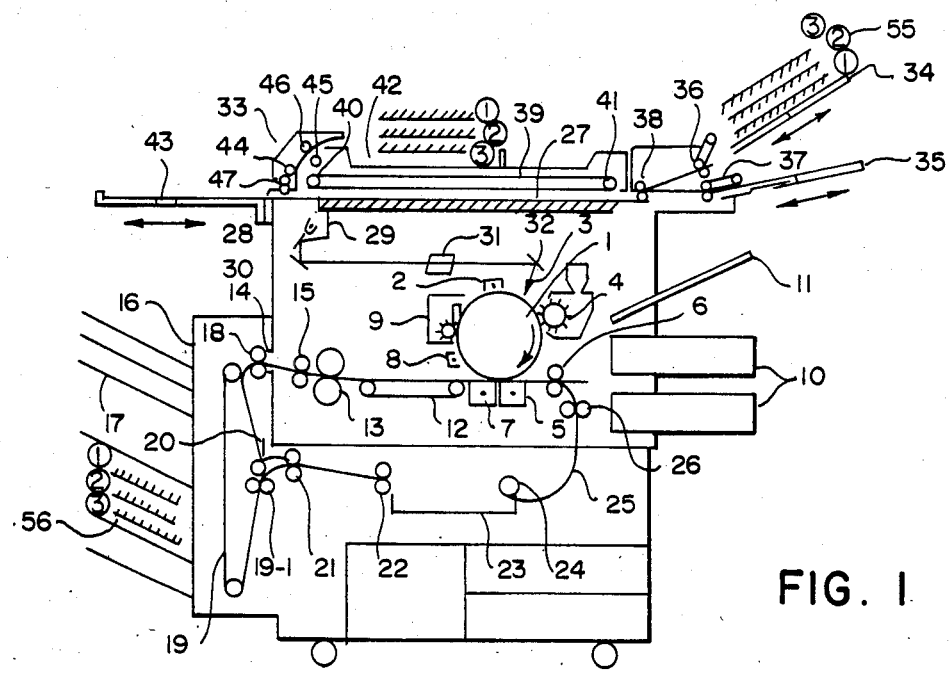
FIG. 1 is a sectional view of an electrophotographic copying machine with duplex copying function having an automatic document feeder of the present invention.

Referring to FIG. 1 which schematically shows the construction of the electrophotographic copying machine of the present invention, 1 is a drum photoreceptor driven to rotate in the direction indicated by an arrow, 2 is a corona discharging device that uniformly charges the surface of the photoreceptor 1 with electricity of a specific polarity, 3 is an exposure position at which the image of a document is projected onto the photoreceptor 1, 4 is a developing unit, 5 is a corona discharging device to electrostatically transfer the visualized image (toner image) on the photoreceptor 1 onto a copy paper fed through transport rollers 6, 7 is an AC corona discharging device that removes electric charge from the copy paper to allow electrostatic separation from the photoreceptor 1, 8 is a charge remove (AC corona discharging device) for the photoreceptor 1, and 9 is a cleaning device to remove residual toner from the photoreceptor 1 after image transfer operation.

When a feed signal is received, a copy paper is supplied either from paper cassettes 10 or a paper feeder tray 11 to the transport rollers 6. The transport rollers 6 serve to control the paper feeding speed so that the leading edge of the copy paper meets the leading edge of the toner image on the photoreceptor 1 at the transfer position. At the transfer position, the toner image on the photoreceptor 1 is transferred onto the copy paper which is then separated by the AC corona discharging device 7 from the photoreceptor 1 and conveyed via a suction belt 12 to fixing rollers 13. The fixing rollers 13 may be pressure fixing rollers or thermal fixing rollers. Discharge rollers 15 are provided behind the fixing rollers 13. The discharge rollers 15 serve to discharge copy papers through a paper outlet 14.

A sorter 16 is attached to the paper outlet 14 to arrange copy papers in proper order. To this purpose, the sorter 16 has a plurality of trays 17. Copy papers are delivered to the appropriate trays 17 by means of transport rollers 18 installed facing the paper outlet 14 and by means of a transport belt 19. Each tray 17 has a guide plate (not shown) to guide copy papers properly. The detailed description of the sorter 16 is omitted here because its construction is well known. The sorter 16 of the present invention delivers copy papers onto the trays 17 with the image-transferred side facing upward.

In the duplex copying mode, the transport direction of copy papers is reversed in the sorter 16; the single side copied paper is not delivered to the sorter 16 but led to the rear side of the transport belt 19 (opposite side from the trays 17) by transport route switchover means (not shown). When the trailing edge of the single side copied paper reaches transport rollers 19-1 which constitute a reversing transport mechanism, the rotation of the transport rollers 19-1 is reversed to transmit the copy paper through a guide 20 to transport rollers 21 and 22. The single side copied paper is thus conveyed by the transport rollers 22 to a copy paper reservoir tray 23 where it is temporarily stored with the image-transferred side facing upward. The copy paper reservoir tray 23 is provided with a feed roller 24 to feed copy papers from the reservoir tray 23 toward the image transfer position. The copy paper fed by the rotating feed roller 24 is led by a guide passage 25 and supplied through transport rollers 26 to the transport rollers 6. Thereafter, the transport rollers 6 transmit the copy paper to the image transfer position at which the image of a document is transferred onto the other side of the copy paper in the same procedure as the first image transferring operation. Then, the double side copied paper is transmitted through the fixing rollers 13 to the sorter 16. This time, the sorter 16 exhibits its inherent function; the double side copied paper is delivered to a desired tray 17 through the transport belt 19 with the side on which image has been just transferred facing upward.

A document rest 27 made of transparent glass plate is installed in the upper part of the copying machine to provide for projection of a document image onto the photoreceptor 1. A lighting equipment 28 containing a copy lamp is installed under the document rest 27 to illuminate the document on the document rest. The light reflected by the document is reflected by a first mirror 29 and then by a pair of second mirrors 30 to be directed to an image forming lens 31. Then, the image is further reflected by a third mirror 32 to be projected onto the photoreceptor 1. The lighting equipment 28 and the first mirror 29 are supported on the same supporting member. The document on the document rest 27 is optically scanned by moving the supporting member in parallel to the document rest 27. The second mirror 30 is supported on a second supporting member which is moved in the same direction with the first supporting member but at a speed ½ of that of the first supporting member. Thus, the image of the document on the document rest 27 is optically scanned and projected onto the rotating photoreceptor 1.

An (automatic) document feeder 33 is installed facing the document rest 27. The automatic document feeder 33 of the present invention has two vertically arranged document trays 34, 35 on which document sheets to be copied are piled. Document feed rollers 36, 37 are provided for the trays 34, 35 respectively. The document fed by the feed rollers 36, 37 is conveyed through transport rollers 38 onto a transport belt 39 provided on the document rest 27. The transport belt 39 is extended by rollers 40, 41 installed at the positions corresponding to the ends of the document rest 27. By the rotating roller 40, the transport belt 39 moves sliding along the document rest 27. Accordingly, the document supplied through the transport belt 39 is transported on the document rest 27, being clamped between the document rest 27 and the transport belt 39. The transport belt 39 is controlled so that it stops when the leading edge of a document comes to the predetermined position on the document rest 27 and starts moving when optical scanning operation for the document on the document rest is completed. When it starts moving again, the transport belt 39 discharges the document while conveying a new document to the predetermined position on the document rest 27.

A switchover plate 44 is provided at the document outlet of the transport belt 39. The switchover plate 44 directs the document that has been copied to a document receiver 42 installed on top of the automatic document feeder 33 or to a document receiving tray 43 protruding from the copying machine main body, selectively. The switchover plate 44 is pivotally supported at one end to change the discharging route of documents. According to the present invention, the switchover plate 44 is so controlled as to select the document receiver 42 when single side copying mode is selected. A document sheet directed to the document receiver 42 is discharged through a direction reversing guide 45 and discharge roller 46 onto the document receiver 42 with the image-bearing side inversed. When the duplex copying mode is selected, the switchover plate 44 is so controlled as to select the document receiving tray 43. A document sheet conveyed on the transport belt 39 is then discharged through discharge rollers 47 onto the document receiving tray 43. In this case, the image-bearing side of the document is not inversed.

Figure 3:
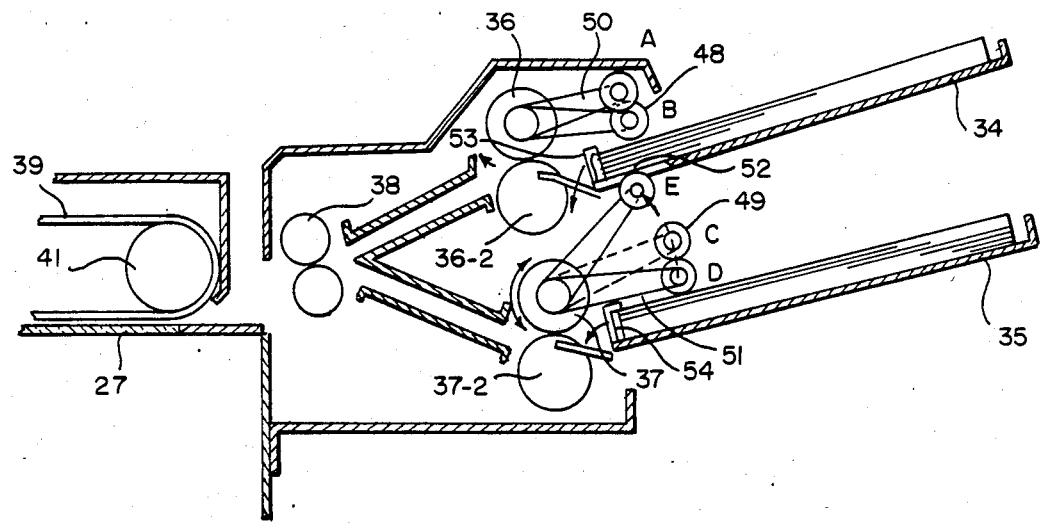
FIG. 3 is a sectional view detailing the document feeding mechanism.

As mentioned above, the automatic document feeder 33 according to the present invention has two vertically arranged document feeding trays 34, 35 either of which is selected for feeding a document. With the upper document feeding tray 34, a document sheet is fed from the top when single side copying mode is selected but from the bottom when duplex copying mode is selected. FIG. 3 shows an embodiment of the document feeding mechanism. As described earlier, the document feeding trays 34, 35 are provided with document feed rollers 36, 37, respectively, to transmit a document to the transport rollers 38. An auxiliary feed roller 48 is connected through a belt 50 with the document feed roller 36. The auxiliary feed roller 48 is driven through the belt 50 by the document feed roller 36 so that it feeds documents one by one from the top of the document pile on the document feeding tray 34. Similarly, an auxiliary feed roller 49 is connected through a belt 51 with the document feed roller 37 and driven through the belt 51 by the roller 37 so that it feeds documents one by one from the top of the document pile on the document feeding tray 35. Normally, the auxiliary feed roller 48 is positioned at "A". When a document feeding instruction is received, the auxiliary roller 48 is energized by a means such as a solenoid (not shown) to be positioned at "B" so that the roller is depressed against the documents on the tray 34. To this purpose, the auxiliary feed roller 48 is rotatable around the axis of the document feed roller 36. The auxiliary feed roller 49 is rotatable around the axis of the document feed roller 37. Unless it feeds documents, the auxiliary feed roller 49 is positioned at "C" (center position). When a document feeding instruction for single side copying mode is received, the auxiliary feed roller 49 is energized by a solenoid (not shown) to be positioned at "D" so that it is depressed against the documents on the lower tray 35. When a document feeding instruction for duplex copying mode is received, the roller 49 is energized by another solenoid (not shown) to be positioned at "E" so that it is depressed against the documents on the upper tray 34 from the bottom. To this purpose, at least the upper tray 34 has an opening 52 in the bottom at the end portion on the feed roller side.

Normally, the document feed rollers 36, 37 are driven at the same feeding speed as the transport rollers 38. Specifically, when a document is supplied from the top of the documents on the trays 34, 35, the document feed rollers 36, 37 are driven for the same feeding speed and in the same direction as the transport rollers 38 while preventive rollers 36-2, 37-2 facing the rollers 36, 37 are driven in the inverse direction of the rotation of the rollers 36, 37 so as to prevent more than one document sheet from being fed. These roller operations are only for single side copying mode.

In duplex copying mode, the document feed roller 36 rotates in the inverse direction of the rotation in the single side copying mode, while the roller 36-2 facing the document feed roller 36 rotates for the same feeding speed and in the same direction as the transport rollers 38. At this time, the document feed roller 37 rotates in the inverse direction of the rotation of the document feed roller 36. Consequently, the auxiliary roller 49 is energized by the solenoid to be positioned at "E". Thus, the auxiliary roller 49 is depressed against the bottom of the document pile on the upper tray 34 to feed a document toward the roller 36. Meanwhile, to ensure sufficient feeding force of the auxiliary roller 49 in feeding a document from the bottom of the tray 34, the auxiliary roller 48 is energized to be positioned at "B". One-way clutch may be installed between the document feed roller 36 and the auxiliary roller 48 to prevent the roller 48 from rotation at this time.

Stoppers 53, 54 are provided at the leading ends of the upper and lower trays 34, 35, respectively, to align the leading ends of the document sheets. The stoppers 53, 54 shift in the direction indicated by an arrow, as required, to facilitate document feeding.

As described in the above, the automatic document feeder of the present invention, when installed in an electrophotographic copying machine, permits correct sorting of the documents and the copy papers, regardless of whether single or duplex copying mode is selected. Operation of the present invention is as follows.

Suppose three document sheets 55 are loaded on the upper document tray 34 as shown in FIG. 1. For simplification, it is assumed that a copy is made for each of these three documents in single side copying mode. The copying machine is set for the single side copying mode by key operation. The document sheets 55 are put on the tray 34 with the imagebearing side facing downward.

Since single side copying mode is selected, the switchover plate 44 is positioned so that documents are directed to the document receiver 42. The sorter 16 is set so that copy papers discharged from the paper outlet 14 are delivered to desired trays 17. With this state, depress the copy start switch. Then, the top sheet (the third document sheet ③ of the document pile 55 on the document tray 34 starts to be supplied. Specifically, as shown in FIG. 3, the auxiliary roller 48 is positioned at "B" and driven for rotation through the belt 50 when the document feed roller 36 rotates. Thus, the top document sheet ③ is supplied. At this time, the roller 36-2, which rotates in the same direction as the document feed roller 36, prevents the second top sheet ② from being supplied.

The third document sheet ③ thus supplied by the auxiliary roller 48 is fed from the document feed roller 36 to the transport rollers 38 and then onto the transport belt 39. When the document sheet is conveyed to the predetermined position on the document rest 27, the transport belt 39 stops. Then, the lighting equipment 28, the first mirror 29 and the second mirror 30 are operated to scan the image on the document on the document rest 27. By this operation, the image is formed at the exposure position 3 on the uniformly charged rotating photoreceptor 1. An electrostatic latent image corresponding to the image on the document is thus formed on the photoreceptor 1. The latent image is visualized with toner by the developing unit 4. At the transfer position, the toner image is electrostatically transferred by using the corona discharging device 5 onto a copy paper supplied through the transport rollers 6 either from the paper feeding cassettes 10 or tray 11.

The copy paper on which toner image has been transferred is separated from the photoreceptor 1 by the AC corona discharging device 7 and conveyed on the suction belt 12 to the fixing rollers 13. After image fixation, it is transmitted via the discharge rollers 15 to the sorter 16. In the sorter 16, the copy paper 56 ③ on which image of the third document sheet ③ has been transferred is delivered via the transport rollers and transport belt 19 to a desired tray 17 with the image-transferred side facing upward.

After image transfer operation, residual electric charge is removed from the photoreceptor 1 by the AC corona discharging device 8 and the residual toner by the cleaning device 9, so that the photoreceptor 1 is ready for the next image transfer operation.

Meanwhile, the lighting equipment 28, first mirror 29 and second mirror 30 return to the original (home) position after scanning the document for projecting the image onto the photoreceptor 1. When scanning completes, the transport belt 39 resumes moving to discharge the document from the document rest 27. The document thus discharged is delivered through the discharge roller 46 onto the document receiver 42, being guided by the switchover plate 44 and direction reversing guide 45. On the document receiver 42, the document's image-bearing side faces upward. When the third document sheet ③ has been discharged, the next top document sheet (the second sheet ② is fed from the tray 34 to the moving transport belt 39 and stops at the predetermined position on the document rest 27.

Thereafter, the same copying operation as that for the third document sheet ③ is repeated until the copy paper 56 ② is discharged to the sorter 16 and delivered to the same tray 17 as the last copy paper ③. The document sheet 55 is discharged from the document rest 27 onto the document receiver 42. As perceived, the document sheets on the receiver 42 and the copy papers on the tray 17 of the sorter 16 are arranged in the same order as the original documents on the document tray 34.

Figure 2:
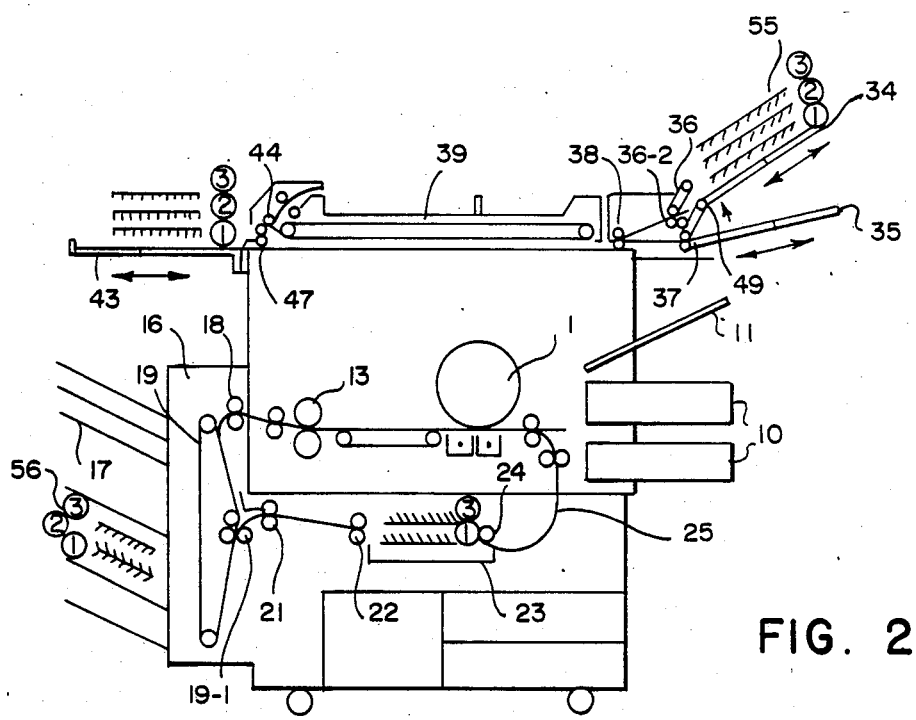
FIG. 2 is a sectional view of the electrophotographic copying machine for reference in explanation of the operation of the present invention.

Now, copying operation in the duplex copying mode will be described. The copying machine is set for the duplex copying mode by key operation. By this operation, the switchover plate 44 of the document feeder 33 is positioned so that documents are directed to the document receiving tray 43 as shown in FIG. 2. The sorter 16 is set so that copy papers return to the copying machine for duplex copying by the function of the reversing mechanism.

When the copy start switch is depressed with this state, the auxiliary roller 49 is energized by a solenoid to be shifted from the position "C" to the position "E" so that it is depressed against the bottom document sheet 55 (the first sheet ① on the upper tray 34. As the document feed roller 37 rotates (in the reversed direction from that for the single side copying mode), the auxiliary roller 49 is driven for rotation through the belt 51 to feed the bottom document sheet 55 ① from the upper tray 34. At this time, the document feed roller 36 rotates in the same direction as the opposite roller 36-2 to prevent more than one document from being fed by the roller 36-2. The document thus supplied is conveyed on the transport belt 39 to the predetermined position on the document rest 27 through the same route as in the single side copying mode.

Then, the document on the document rest 27 is optically scanned to project the image on the photoreceptor 1. After the image on the photoreceptor 1 is transferred onto a copy paper which has been supplied in a timely manner, the copy paper is passed through the fixing rollers 13 and discharged via the discharge rollers 15 to the sorter 16. In the sorter 16, the copy paper is directed to the rear side of the transport belt 19 opposite from the copy tray 17 and further sent downward by the transport rollers 19-1. When the trailing end of the copy paper comes to the rollers 19-1, the rotation of the rollers 19-1 is reversed so that the copy paper is redirected through the guide plate 20 to the transport rollers 21 and 22 and then into the reservoir tray 23 where the copy paper is temporarily stored with the image-transferred side facing upward.

Meanwhile, when scanning completes, the transport belt 39 resumes moving to discharge the document from the document rest 27. In this case, the switchover plate 44 directs the document to the transport rollers 47 to discharge it onto the document receiving tray 43 with the image-bearing side facing downward. The auxiliary roller 49 then feeds the second document sheet ② which is conveyed on the transport belt 39 to the document rest 27. When the document sheet reaches the predetermined position, the transport belt 39 stops. The image on the second document sheet ② is optically scanned to be projected onto the photoreceptor ①.

Meanwhile, the single sided copy paper stored in the reservoir tray 23 is fed by the feed roller 24 and led through the guide passage 25 and transport rollers 26 to the synchronizing transport rollers 6. The transport rollers 6 feeds the single sided copy paper to the transfer position in synchronization with rotation of the photoreceptor 1. Then, the image of the second document sheet is transferred from the photoreceptor 1 onto the other side of the single sided copy paper. The copy paper having images transferred on both sides is transmitted through the fixing rollers 13 and discharge rollers 15 to the sorter 16. This time, the sorter 16 delivers the double sided copy paper to a desired tray 17 with the second document image-transferred side facing upward.

The second document sheet ② that has been scanned optically is discharged from the document rest 27 to the document receiving tray 43 and laid on the first document sheet ①. Then, the third document sheet ③ is supplied to the predetermined position on the document rest 27 to be copied in the same manner as the first document sheet ①. The third document sheet that has been copied is discharged onto the document receiving tray 43. Since no document sheet remains on the document tray 34, document sheet is not supplied any more. The copy paper on which the third document image has been transferred is transported to the reservoir tray 23 for temporary storage. On receiving a signal indicating that no document sheet remains on the tray 34, the feed roller 24 operates to feed the copy paper. Thereafter, the copy paper is transported through the ordinary transport route to the sorter 16 and delivered to the same tray 17 as the last copy paper with the blank side facing upward.

As shown in FIG. 2, even in the duplex copying mode, the copy papers 56 on the tray 17 are arranged in the same order as the original documents 55 on the document tray 34. The document sheets on the document receiving tray 43 is also arranged in the same order as the original documents on the tray 34. Thus, according to the present invention, the document sheets and copy papers discharged are arranged in the same page order as the original documents on the document feeder tray 34, regardless of whether the number of document sheets is even or odd and whether single or duplex copying mode is selected.

Figure 4:
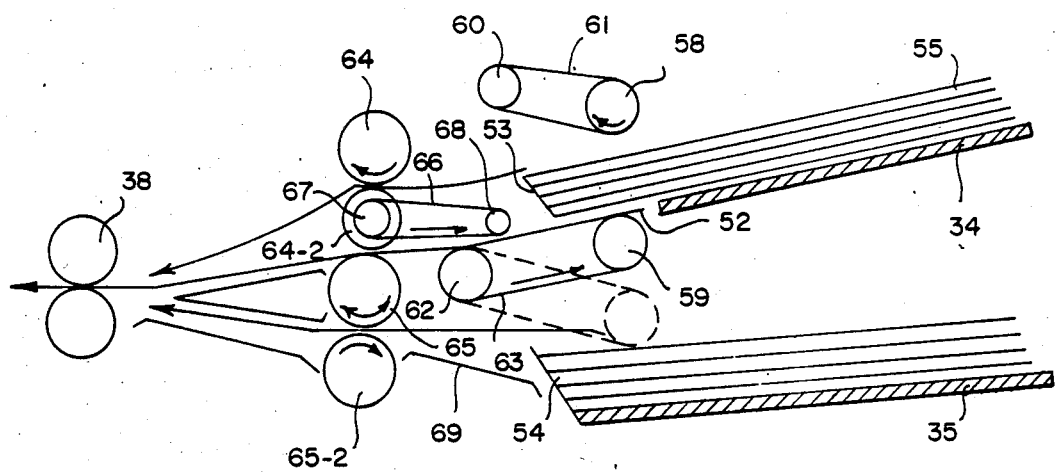
FIG. 4 is a sectional view of an example of the document feeding mechanism according to the present invention.

In the embodiment of the automatic document feeder 33 of the present invention shown in FIG. 3, the auxiliary roller 48 is depressed against the top of the document pile on the tray 34 and the stopper 53 is released while a document sheet is supplied. This enhances the force of the auxiliary roller 49 in feeding a document on one hand. On the other hand, however, this may cause several sheets of document to be fed simultaneously and wedged in between the document feed roller 36 and opposite roller 36-2. If this occurs, multiple sheets of document would be supplied or the document sheets would block the rotation of the rollers, resulting in motor lock. To prevent such a trouble, it is desirable to feed a document one by one whether it is supplied from the top or the bottom of the document pile on the tray. FIG. 4 shows a preferred embodiment to this purpose.

Referring to FIG. 4, the stopper 53 is fixed to the leading end of the upper tray 34. To permit feeding documents from the bottom, the tray 34 has an opening in the bottom through which documents are supplied. Auxiliary rollers 58, 59 are provided to feed documents from the top of the upper and lower trays 34, 35 respectively.

The auxiliary roller 58 is driven through a feed belt 61 by a driving roller 60 and is rotatable around the axis of the roller 60. On feeding a document, the auxiliary roller 58 is energized to be depressed together with the feed belt 61 against the top of the document pile on the tray 34. The auxiliary roller 59 is driven through a feed belt 63 by a driving roller 62 and is rotatable around the axis of the roller 62. When a document is to be fed from the top of the tray 35, the auxiliary roller 59 is energized to be depressed against the top of the document pile on the tray 35 as indicated by broken lines. When a document is to be fed from the bottom of the tray 34, the auxiliary roller 59 is depressed against the bottom of the document pile through the opening 52 in the tray 34.

A document fed by the auxiliary roller 58 is directed to the upper document feed roller 64 which rotates clockwise to feed the document. At this time, the roller 64-2 facing the roller 64 also rotates clockwise, that is, in the same direction as the roller 64 to prevent more than one document from being fed by the roller 64. When a document is fed from the bottom of the tray 34, however, the roller 64-2 rotates counterclockwise to prevent more than one document from being fed by the lower document feed roller 65 which is provided facing the roller 64-2. When a document is fed from the top of the lower tray 35 by the auxiliary roller 59, it is guided by a guide plate 69 and sent in between the document feed roller 65 and the opposite roller 65-2 facing the roller 65. At this time, the document feed roller rotates clockwise. The opposite roller 65-2 also rotates clockwise to prevent more than one document from being fed. The roller 65 rotates counterclockwise when feeding a document from the bottom of the upper tray 34.

An intermediate belt 66 is provided adjacent the feed belt 63. It is extended between a roller 68 and a roller 67 provided coaxially on the roller 64-2. The intermediate belt 66 is driven by rotation of the roller 67. The roller 68 is rotatable around the axis of the roller 67 (or the roller 64-2) so that the intermediate belt 66 is pressed against the feed belt 63 by the tare of the roller 68. When feeding a document from the bottom of the tray 34, the intermediate belt 66 is driven to rotate counterclockwise so as to prevent more than one document from being fed.

To ensure higher feeding force, the feed belts 61, 63 are made of urethane rubber with a high friction coefficient. The intermediate belt 66 which prevents multiple-sheet-feeding is made of CR rubber with different friction coefficient from that of the feed belts 61, 63. Similarly, the feed rollers 64, 65 that serve to feed documents are made of urethane rubber with high friction coefficient, and the rollers 64-2, 65-2 for preventing multiple-sheet-feeding are made of CR rubber with lower friction coefficient from that of the rollers 64, 65.

With the above construction, the automatic document feeder operates as follows in the copying machine set for the single side copying mode. The auxiliary roller 58 and feed belt 61 are lowered by a solenoid to be depressed against the top of the document pile on the tray 34. Then, they are driven for rotation to feed the top document sheet 55. The document that passes over the stopper 53 is guided by the intermediate belt 66 and fed in between the feed roller 64 and opposite roller 64-2. Because of the restriction by the stopper 53, there is very little chance that multiple documents over the stopper 53 simultaneously. A friction member may be provided to the stopper 53 on the surface facing the end of the documents in order to effectively separate only one document sheet from the rest for feeding.

Since the roller 64-2 rotates clockwise, it prevents more than one document from being fed by the document feed roller 64. Accordingly, only one document is fed by the roller 64 to the transport rollers 38. Thereafter, the document is transmitted in the manner as previously described.

The operation of the automatic document feeder for the duplex copying mode is as follows. The auxiliary roller 59 and feed belt 63 are raised to be depressed against the bottom of the document pile 55 through the opening 52 in the upper tray 34. The feed belt 63 and auxiliary roller 52 are driven to rotate counterclockwise. At the same time, the lower feed roller 65, upper roller 64-2 and intermediate belt 66 also rotate counterclockwise.

Accordingly, the bottom document sheet on the tray 34 is fed through the opening of the stopper 53 to the intermediate belt 66 by the operation of the auxiliary roller 59 and feed belt 63. At this time, if the auxiliary roller 58 is lowered to depress the top of the document pile, the feeding performance of the auxiliary roller 59 is enhanced. The intermediate belt 66 serves to prevent multiple-sheet-feeding. Specifically, if more than one document is fed by the feed belt 63, the intermediate belt 66 which is pressed by the tare against the feed belt 63 functions to return excess document sheets. Therefore, there is no chance that multiple sheets of document are wedged in between the belts 66, 63, halting the rotation thereof. Thus, the intermediate belt 66 permits only a few number of or probably one document to pass through.

The document allowed to pass through the intermediate belt 66 is then sent in between the upper roller 64-2 and lower roller 65. The upper roller 64-2 rotates counterclockwise to block any document sheet other than the bottom sheet to pass through. As a result, only one bottom document is fed by the rotating feed roller 65 to the transport rollers 38. Multiple-sheet-feeding is thus prevented in two stages to ensure that only one document sheet is fed to the copying machine. The intermediate belt 66 prevents multiple sheets of document from being wedged between the rollers 64-2, 65, thereby, eliminating the possibility of trouble such as roller stop or motor lock.

The process of feeding documents from the lower tray 35 is the same as the conventional process. In the single side copying mode, when the lower tray 35 is selected, the auxiliary roller 59 is positioned to depress the document sheets 55 on the tray 35 and feed the top sheet by rotation. The document sheet passes over the stopper 54 and is fed through the feed roller 65 to the transport rollers 38. In this case, the opposite roller 65-2 rotates clockwise to prevent more than one sheet from being fed by the roller 65.

The automatic document feeder has been described focusing on the route for feeding documents either in single side or duplex copying mode. The automatic document feeder of the present invention may be applied for selectively feeding documents either from the top or bottom of the tray 34. In feeding documents from the top of the upper tray 34, clockwise rotation of the roller 64-2 causes the intermediate belt 66 to rotate clockwise, which can force the feed belt 63 to rotate. This can be prevented either of the two methods: one is to allow the intermediate belt 66 to be separated a little (by about 1mm) by a solenoid from the feed belt 63 when documents are to be fed from the top of the upper tray 34, and the other is to install a one-way clutch between the rollers 64-2 and 67 so that only counterclockwise rotation is transmitted from the roller 64-2 to the roller 67.

According to the present invention, as understood from the above, documents are selectively supplied either from the top or bottom of the document tray depending whether single side or duplex copying mode is selected. As a result, copy papers are correctly sorted regardless of the copying mode.

In addition, the automatic document feeder of the present invention prevents multiple documents from being fed to the feed roller, thereby eliminating the possibility of a roller stop and ensuring that each document sheet is fed one by one to the copying machine. Particularly when sorted by the sorter, in multi copy mode, the resultant copy papers in each of the copy trays are arranged in the same page order as the original documents. Troublesome sorting work that would be otherwise required is therefore eliminated.

While only certain embodiments of the present invention have been described, it will be apparent to those skilled in the art that various changes and modifications may be made therein without departing from the spirit and scope of the present invention as claimed.

What is claimed is:

1. An automatic document feeder that feeds documents individually to a document scanning surface from a document pile on an upper tray, comprising: a first upper feeding member that feeds a document from the top of a document pile on an upper tray; a second upper feeding member that further feeds the document supplied by said first upper feeding member; a first preventive member that is adjacent to said second upper feeding member and that prevents more than one document at a time from being fed through between said second upper feeding member and said first preventive member; a first lower feeding member that feeds a document from the bottom of said document pile on said upper tray; an intermediate member that contacts said first lower feeding member and is linked with said first preventive member, said intermediate member preventing more than one document at a time from being fed through between said first lower feeding member and said first preventive member; and a second lower feeding member that is adjacent to said first preventive member and that feeds the document supplied by said first lower feeding member between said first preventive member and said second lower feeding member.

2. An automatic document feeder as in claim 1, wherein said intermediate member is a belt.

3. An automatic document feeder as in claim 1, which additionally comprises a lower tray and a second preventive member, and wherein said first lower feeding member may be lowered so that it feeds a document from the top of a document pile on said lower tray, said second preventive member being juxtapositioned to said second lower feeding member for preventing more than one document at a time from being fed through between said second lower feeding member and said second preventive member.

4. An automatic document feeder as in claim 1, wherein said first upper feeding member is a belt, said second upper feeding member is a roller, said first preventive member is a roller, said first lower feeding member is a belt, said intermediate member is a belt, and said second lower feeding member is a roller.

5. An automatic document feeder as in claim 3, wherein said second preventive member is a roller.

6. An automatic document feeder as in claim 4, wherein said first preventive member rotates in the same direction as said second upper feeding member so as to prevent more than one document at a time from being fed through between said second upper feeding member and said preventive member; and wherein said first preventive member rotates in the same direction as said second lower feeding member so as to prevent more than one document at a time from being fed through between said second lower feeding member and said first preventive member.

7. An automatic document feeder as in claim 5, wherein said second preventive member rotates in the same direction as said second lower feeding member so as to prevent more than one document at a time from being fed through between said second lower feeding member and second preventive member.

8. An automatic document feeder as in claim 6, wherein said first upper feeding member and said first lower feeding member are made of a material with a higher friction coefficeint than the material from which said intermediate member is made and wherein said second upper feeding member and said second lower feeding member are made of a material with a higher friction coefficient than the material from which said first preventive member is made.

9. An automatic document feeder as in claim 7, wherein said second lower feeding member is made of a material with a higher friction coefficient than the material from which said second preventive member is made.

10. An automatic document feeder as in claim 8, wherein said first upper feeding member, said first lower feeding member, said second upper feeding member, and said second lower feeding member are all made of urethane rubber; and wherein said intermediate member and said first preventive member are made of CR rubber.

11. An automatic document feeder as in claim 9, wherein said second lower feeding member is made of urethane rubber and said second preventive member is made of CR rubber.

12. An automatic document feeder as in claim 6, which additionally comprises a means to prevent said first lower feeding member from feeding a document from the bottom of a document pile on said upper tray when said first upper feeding member feeds a document from the top of said document pile.

13. An automatic document feeder as in claim 1, which additionally comprises a means that selectively feeds documents from either the top or the bottom of a document pile on said upper tray.

* * * * *